US005298754A

United States Patent [19]

Anderson et al.

[11] Patent Number: 5,298,754

[45] Date of Patent: Mar. 29, 1994

[54] GAS FLOW GEIGER-MUELLER TYPE DETECTOR AND METHOD MONITORING IONIZING RADIATION

[75] Inventors: Charles W. Anderson, Quincy; John W. Nagy, Burlington; Leonard R. Smith, Carlisle, all of Mass.

[73] Assignee: E. I. du Pont de Nemours and Company, Wilmington, Del.

[21] Appl. No.: 7,385

[22] Filed: Jan. 21, 1993

Related U.S. Application Data

[63] Continuation of Ser. No. 752,748, Aug. 30, 1991, abandoned.

[51] Int. Cl.[5] .......................... G01T 1/185; G01T 1/18

[52] U.S. Cl. ...................................... 250/379; 250/374

[58] Field of Search ........................ 250/374, 379, 380; 313/93

[56] References Cited

U.S. PATENT DOCUMENTS

| | | | |
|---|---|---|---|
| 2,499,830 | 3/1950 | Molloy | 250/380 |
| 2,712,088 | 6/1955 | Whitman | 313/93 |
| 3,603,831 | 9/1971 | Kimmel | 313/93 |
| 3,916,200 | 10/1975 | Sparks, Jr. et al. | 250/389 |
| 3,955,085 | 5/1976 | Moran | 250/336 |
| 4,101,769 | 7/1978 | Bingo et al. | 250/361 R |
| 4,409,485 | 10/1983 | Morris et al. | 250/374 |
| 4,431,921 | 2/1984 | Filthuth | 250/374 |
| 4,441,024 | 4/1984 | Anderson | 250/380 |
| 4,445,037 | 4/1984 | Anderson | 250/380 |
| 4,562,354 | 12/1985 | Keller et al. | 250/388 |
| 4,618,774 | 10/1986 | Hascal et al. | 250/364 |
| 4,633,089 | 12/1986 | Wijangco | 250/374 |
| 4,644,167 | 2/1987 | Sorber | 250/374 |
| 4,830,830 | 5/1989 | Tamotu et al. | 422/71 |

FOREIGN PATENT DOCUMENTS

| | | | |
|---|---|---|---|
| 554584 | 1/1957 | Belgium . | |
| 1167477 | 8/1968 | United Kingdom | 250/380 |

OTHER PUBLICATIONS

Kiefer et al, "Large-Area Flow Counters Speed Radiation Measurements", Nucleonics, 19 (12), Dec. 1961, pp. 51-54 250/380.

Chase and Rabinowitz, Principles of Radioisotope Methodology, 3rd Ed., pp. 62-63, 68-71 (1967), Burgess Pub. Co., Minneapolis, Minn.

*Primary Examiner*—Carolyn E. Fields

[57] ABSTRACT

A substantially stable, substantially portable open-window gas flow Geiger-Mueller type detector capable of monitoring ionizing radiation having an electrically conductive chamber with one or more fluid inlets and opening to receive radiation. A counting gas is provided to the chamber through the inlet(s). The detector also has at least one insulated anode positioned in the chamber and a radiation permeable cover substantially sealed over the opening. A source of electricity is connected to the chamber and electric pulses generated within the chamber are detected when an ionizing event is caused by ionizing radiation entering the chamber.

13 Claims, 3 Drawing Sheets

GAS FLOW GEIGER-MUELLER TYPE DETECTOR AND METHOD MONITORING IONIZING RADIATION

This is a continuation of application Ser. No. 07/752,748 filed Aug. 30, 1991, now abandoned.

FIELD OF THE INVENTION

This invention relates generally to devices for the detection and measurement of radiation and, in particular, to a substantially stable, substantially portable open window gas flow Geiger-Mueller type detector which is capable of monitoring ionizing radiation and to a method for monitoring such radiation.

BACKGROUND OF THE INVENTION

A large number of different types of radiation sensing elements have been developed. One such device is a Geiger-Mueller detector. Basically, it consists of a pair of electrodes surrounded by a counting gas especially selected for the ease with which it can be ionized. When radiation ionizes the gas, the ions so produced travel toward the electrodes between which is maintained a high electrical potential. The motion of the ions toward the electrodes constitutes an electric signal which can be detected and recorded electronically. Thus, each particle or ray of radiation passing through the Geiger-Mueller tube which ionizes the counting gas produces an electrical signal, the number of such signals being a measure of the intensity of the radiation.

Geiger-Mueller detectors are available in a variety of forms such as the "side-window" or "end-window" type of tube which are so named because they have a thin window at either one side or at one end through which the radiation passes. The end-window type consists of a metal cylindrical envelope or one made of glass the inside of which has been coated with a conducting material. The wall of the tube constitutes the negative electrode known as the cathode. In the center, concentrically aligned, is a fine metal wire which serves as the anode.

The space between the electrodes is filled with a counting gas, such as helium or argon which can be used along with a small amount of a polyatomic gas such as alcohol or butane, if internal quenching is desired. However, the polyatomic gas is not needed if the detector is quenched externally. The window prevents the escape of the gas to the atmosphere, yet is sufficiently thin so that it allows the passage of certain types and energy of ionizing radiation into the tube. This type of tube is most useful for detecting moderate to high energy beta particles.

Other types of radiation sensing elements include the proportional detector, the ionization chamber detector, and a scintillation detector. Each of these detectors differs in its mode of operation and in its sensitivity to a particular type of radiation. They are similar in that they convert ionizing radiation into electrical signals.

A scintillation detector is used in a liquid scintillation counter to detect the radiation emitted from a sample (potentially contaminated with radioactive material) which is introduced into the counter. In this system a contaminated sample is placed in a vial containing a mixture consisting of scintillation fluor and a solvent. The vial is then introduced into a dark chamber where emitted photons caused by the interaction of ionizing radiation and the fluor are detected and counted. There are a number of disadvantages associated with this method: the instrument is expensive; it is so large that it is not portable and the samples to be evaluated must be brought to it, for fixed contamination this would require defacing an object to obtain a sample; the instrument is sensitive (requiring it to be located remote from areas where radioactivity is handled) and complex, needing regular maintenance; there is a delay between when the sample is prepared and counting is effected; it is designed to count batches of samples and is inefficient to use for evaluating individual samples; and it is necessary to purchase, store and dispose of chemicals which can have additional disadvantages in being expensive, flammable, toxic, and also necessitate the disposal of hazardous waste.

Liquid scintillation counters are useful to detect low energy radiation which cannot enter a closed window Geiger-Mueller type tube. However, open window Geiger-Mueller tubes are capable of detecting low energy radiation because radiation can enter the tube. Counting gas is continually supplied to the ionization chamber to replenish the gas which escapes through the open window. Such detectors function by placing a sample close to the open window. This is needed because low energy radiation cannot penetrate across a wide air gap. For example, beta radiation produced by tritium can pass only through about one-third of an inch of air at atmospheric pressure.

The disadvantages associated with open window Geiger-Mueller tubes include the following: it is necessary to place the sample next to an open window of the chamber containing an exposed electrode having a potential of about 900 to 1200 volts, thus creating an electric shock hazard; high gas flow and/or constricting the size of the open window is necessary to provide a complete envelope of counting gas around the electrode; high gas consumption is expensive and can require an expensive gas supply manifold entailing use of multiple tanks of gas or frequent interruptions to replace empty gas tanks; instrument start-up requires purging the chamber to displace accumulated air which causes a significant delay before a sample can be counted (premature counting could give a false negative result, i.e., that the sample is free of contamination when in fact it is contaminated); the instrument is difficult to use because any movement of the detector or of air near the detector can displace the counting gas from the electrode region thereby interrupting detection capability. This is not practical when personnel contamination is involved and is unlikely to be practical for sampling objects and facility surfaces.

Open window gas flow proportional counting is similar to the Geiger-Mueller method described above. One important difference is that the proportional detector employs a different electrical potential in order to distinguish among the various types of radiation and, thus the efficiency of the detector is significantly diminished. An example of such a counter is the windowless tritium surface contamination monitor, models PTS-65 and PTS-6M, sold by Technical Associates, 7051 Eton Avenue, Canoga Park, Calif. 91303. Disadvantages associated with this method include the following: the need for sophisticated and expensive electronics which are usually not interchangeable with other commonly used detectors; requires extensive training in order to operate properly; more complex calibration techniques are involved.

Today, it is typical to use liquid scintillation counters for detecting samples which can be easily removed from a surface. Portable thin window proportional counters are used to monitor surfaces suspected to be contaminated with alpha emitters, Non-portable proportional counters are used with samples which can be easily removed from a surface. Portable thin window Geiger-Mueller detectors are used to monitor surfaces suspected to be contaminated with at least one radionuclide emitting moderate and/or high energy beta, gamma, and/or X-radiation.

U.S. Pat. No. 4,633,089, issued to Wijangco et al. on Dec. 30, 1986, describes a hand held radiation detector for measuring localized radiation at low levels of the order of one count per minute which utilizes a sealed chamber defined by a housing.

U.S. Pat. No. 4,644,167, issued to Sorber on Feb. 17, 1987, describes a radiation dose rate measuring device.

U.S. Pat. No. 4,409,485, issued to Morris et al. on Oct. 11, 1983, describes a radiation detector and method of opaquing the mica window.

SUMMARY OF THE INVENTION

This invention concerns a substantially stable, substantially portable open-window gas flow Geiger-Mueller type detector capable of monitoring ionizing radiation comprising:

a) an electrically conducting chamber having one or more fluid inlets, and an opening sized to receive said radiation;

b) fluid supply means connected to said inlet;

c) at least one insulated anode positioned in the chamber;

d) a radiation permeable cover substantially sealed over said opening;

e) electrical supply means connected to the chamber; and f) means connected to said chamber for detecting electric pulses generated within the chamber when an ionization event is caused by the radiation entering the chamber.

In another embodiment this invention concerns a method for monitoring ionizing radiation comprising:

a) placing a substantially stable, substantially portable open-window gas flow Geiger-Mueller type detector capable of monitoring ionizing radiation including an electrically conducting chamber having one or more fluid inlets, and an opening sized to receive said radiation; fluid supply means connected to said inlets; at least one insulated anode positioned in the chamber; a radiation permeable cover substantially sealed over said opening; electrical supply means connected to the chamber; and means connected to the chamber for detecting electric pulses generated within the chamber when an ionization event is caused by the radiation entering the chamber, proximate a radiation detection target area;

b) continuously introducing fluid into said chamber;

c) energizing said detector;

d) causing radiation entering said chamber to react with the fluid to produce ions;

e) causing negative ions to contact an electrode to create electrical pulses; and f) detecting the number of pulses.

DETAILED DESCRIPTION OF THE INVENTION

The term "substantially stable" as used herein means that the detector is capable of detecting contamination when being used in a variety of ways under different conditions. For example, possible contamination can be detected in a breezy outside environment. In another example, detection can be effected by simply moving the detector in any orientation with a mobile frisking-type action.

Figure 1:
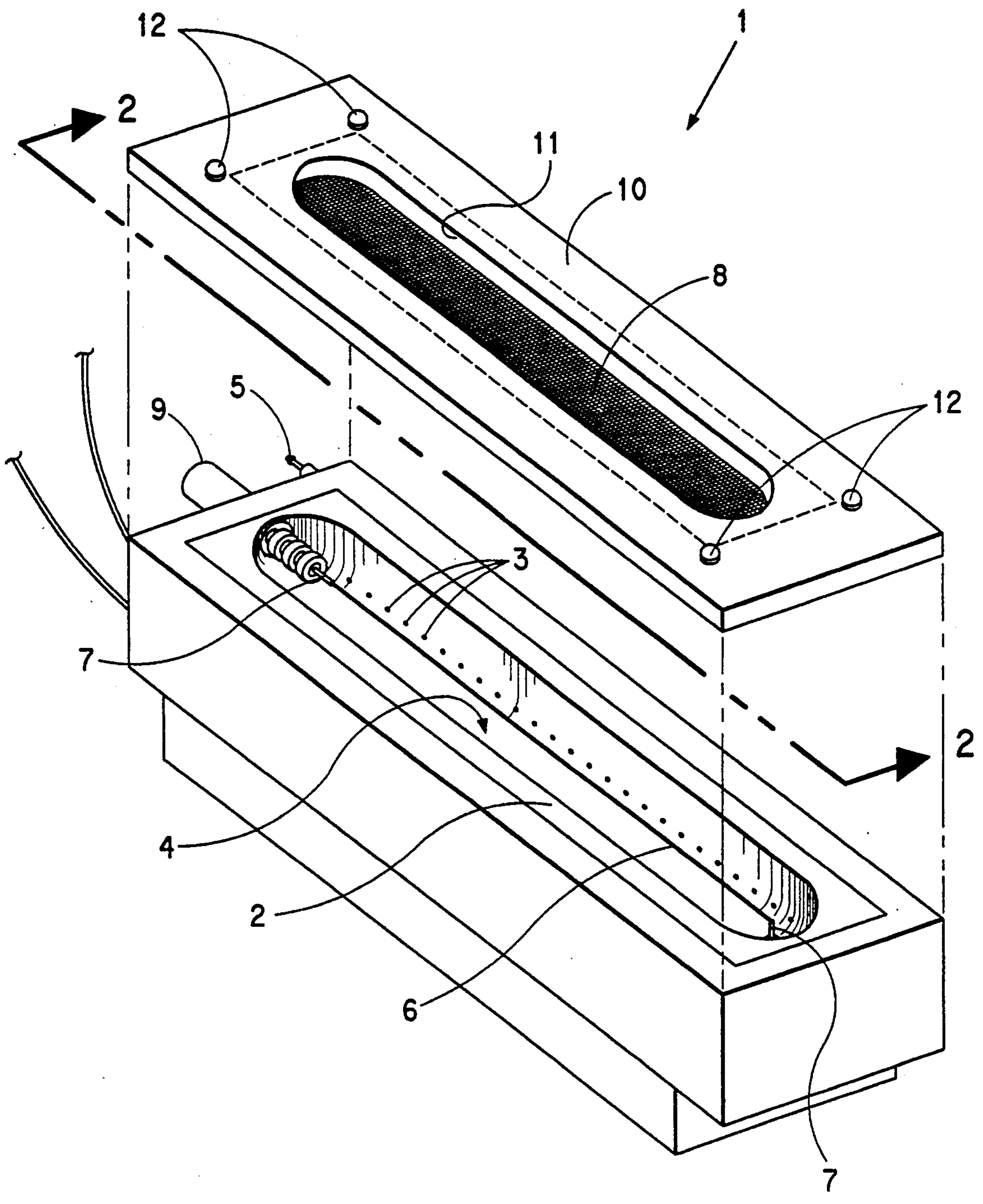
FIG. 1 is a perspective view, partially broken apart for ease of understanding, of the detector in accordance with a preferred embodiment of the present invention.

FIG. 1 is a perspective view depicting the substantially stable, substantially portable Geiger-Mueller type detector of the invention capable of detecting ionizing radiation. Examples of such radiation include radiation produced by beta emitters, gamma emitters, X-ray emitters, and alpha emitters. Preferably, the ionizing radiation detected by using the instrument of the invention is beta radiation and, more particularly, low energy beta radiation especially low energy beta radiation produced by tritium.

The detector (1) of this invention has an electrically conducting chamber (2) which functions as the cathode. The chamber (2) can be made from virtually any solid material which is capable of being machined. It should also be easily decontaminated. Such materials include but are not limited to metals, plastics, resins, etc. The preferred material is Lucite®. The chamber (2) can be designed in any shape. However, it is desirable that the shape of the chamber be such that the purge time is reduced. Purge time is the amount of time needed to purge air from the detector prior to start-up.

The chamber shape should also be such as to be substantially free of extraneous electrical discharges. The inner surface of the chamber should be substantially smooth and can be any conductive material suitable for such use including, but not limited to metal, foil, etc. Preferably, the conductive material used is a conductive paint which can be applied onto the inner surface of the chamber using conventional application techniques such as spraying the conductive material onto the inner surface of the chamber. Any commercially available electrically conductive paint can be used.

The electrically conducting chamber has one or more fluid inlets (3) and an opening (4) sized to receive the ionizing radiation. The size of the opening depends upon how the detector of the invention will be used and can be varied as will be apparent to those skilled in the art.

Figure 2:
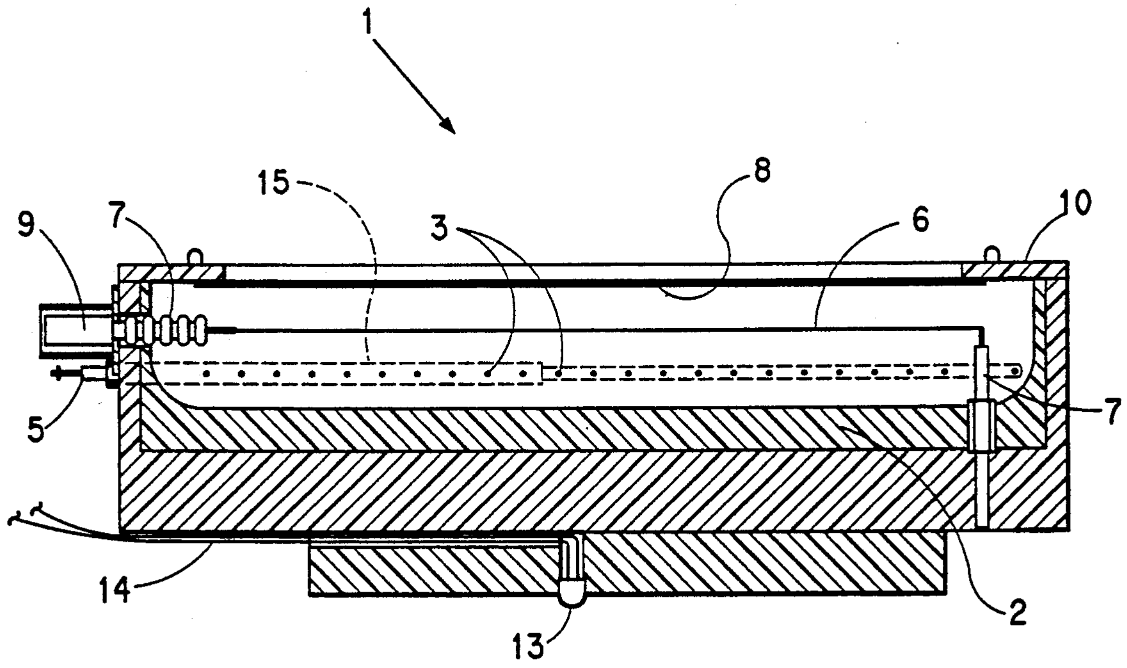
FIG. 2 is a side elevational view, taken in section, of the detector shown in FIG. 1.

Fluid supply means (5) are connected to the inlet or inlets (3) for providing fluid, e.g., a counting gas to the chamber. The inlet or inlets (3) assist in continuously providing substantially uniform delivery of fluid to the chamber (2) at a substantially constant flow rate which can be accomplished in a variety of ways. For example, fluid supply means having a gradually decreasing or stepped diameter as depicted in FIG. 2 can be used. The diameter decreases such that fluid is delivered substantially uniformly to each inlet. Any fluid supply means known to those skilled in the art can be used. One example of such means is a gas distribution manifold having a gradually decreasing diameter which can consist of one or more orifices extending into the chamber wall. One advantage provided by the inlet or inlets (3) is that the purge time needed is reduced. This is further enhanced by having more than one inlet. The chamber has a length greater than the chamber depth, and the inlets are spaced along a side wall of the chamber along the lower half of the side wall.

Any fluid can be used with the detector of this invention. However, it is preferred that the fluid be a counting gas. Any counting gas known to those skilled in the art can be used. There can be mentioned argon or helium. However, once ionization of the counting gas has been initiated, the chamber would continue to discharge continuously unless turned off or quenched by some other process. Quenching can be done externally or internally. If internal quenching is preferred then it is desirable that a small quantity of a polyatomic gas such as alcohol or butane be mixed with a gas like helium to absorb some of the energy of the positive ions after an ionizing event. The small amount needed is readily within the skill in the art to determine. For example, a preferred counting gas is helium mixed with approximately 0.95% isobutane.

FIG. 1 also shows that an insulated anode (6) is positioned in the chamber. For example, the anode can be positioned coaxially. However, as those skilled in the art will appreciate the anode need not be positioned coaxially in order to function properly. Any conductive material such as tungsten can be used as the anode. Any material suitable for insulation can be used to insulate the anode in any conventional manner. In a preferred embodiment, conductive material is affixed between Teflon ® insulated standoffs (7) positioned in the chamber using any conventional means the result of which is that the anode (6) is insulated from the chamber (2).

The chamber also has an opening sized to receive ionizing radiation (4) over which is sealed a radiation permeable cover (8). The size of the radiation permeable cover (8) can vary depending upon the size of the opening in the chamber as those skilled in the art will appreciate. The radiation permeable cover (8) is an important aspect of the invention. The cover (8) should permit the ingress of ionizing radiation while providing more resistance to the egress of the fluid in the chamber. Thus, a more stable envelope of fluid in the chamber is maintained. It should be fairly easy to clean. It should be non-reactive, for example, it should not corrode or react with water. It should not permit the ingress of dust and other such particles as well as precluding the ingress of other contaminants such as radioactive material which might be deposited on the cover itself. It should be reasonably strong. A wide variety of materials are available for the radiation permeable cover. There can be mentioned woven or perforated metals and woven or perforated plastics. Preferably, the radiation permeable cover can be a stainless steel screen having a mesh of 400×400 per linear inch and a 36% open area. As was noted above, another advantage provided by the radiation permeable cover is stability in that a substantially constant envelope of fluid is maintained in the chamber by permitting a substantially slow egress of fluid from the chamber. The radiation permeable cover (8) can be affixed to the chamber using any means available to those skilled in the art such as glue, tape, etc.

Electrical supply means (9) are connected to the chamber by way of a conventional electrical circuit to a source of electricity located outside of the chamber which, for ease of handling, can preferably be a portable source of electricity such as a battery. The source of electricity is in turn connected by way of a conventional electrical circuit to the detection chamber. In a preferred embodiment the electrical supply means (9) can serve a dual function by providing power to the chamber and by transmitting the signal generated by an ionization event in the chamber to means for detecting such pulses. It is also contemplated that additional means can be connected to the chamber for detecting electric pulses generated within the chamber when an ionizing event is caused by ionizing radiation entering the chamber. A conventional meter can be included at some point in the electrical circuit so that any electrical signal in the circuit can be detected and/or measured.

In another embodiment, the detector of the invention further comprises a substantially flat plate (10) connected to the cover (8) and having an opening (11) sized to permit the ionizing radiation to pass through the cover (8) and the chamber opening (4). Such a plate can be described in one aspect as a collimator. The size of the opening will depend upon how the detector will be used. In addition, the opening in the flat plate (10) need not be the same size as the opening in the detection chamber. For example, the opening in the plate (11) can be smaller in size than the opening (4) in the detection chamber. The flat plate (10) can be affixed to the radiation permeable cover (8) using any conventional means such as glue, screws, etc. Preferably, a few pieces of pressure sensitive silicone adhesive transfer film such as that manufactured by 3M Company can be used. It is desirable to use screws (12) to bolt the flat plate (10) to the chamber. Additionally this provides a means for spacing between the side of the detector to which the radiation permeable cover (8) is affixed and the radiation detection target. However, if glue is used then spacing means can be affixed to the detector to provide a small gap. For example, stand-offs can be used in lieu of screws. These spacing means and the plate help to partially protect the radiation permeable cover, to further reduce contamination of the radiation permeable cover (8), and to provide a small gap to allow proper purging of the detector should the detector be facing radiation permeable cover side down on a substantially flat surface.

It has been found that when the radiation permeable cover is affixed to the plate as described above then if the detector of the invention comes into close proximity or contact with a radiation detection target with which static electricity is associated the detector of the invention will be inherently grounded against any spurious discharge caused by the static electricity. In addition, the detector response to radiation is better controlled because ions occurring outside the chamber will have great difficulty migrating into the chamber.

FIG. 2 is a side elevational view of the detector of the invention. It depicts the detector of the invention having the fluid supply means described above to provide substantially uniform delivery of fluid to the chamber at a substantially constant flow rate. It further depicts the detector of the invention being equipped with means for indicating that the detector is operational (13). An example of such means includes a light bulb to which is attached appropriate means for energizing (14).

Figure 3:
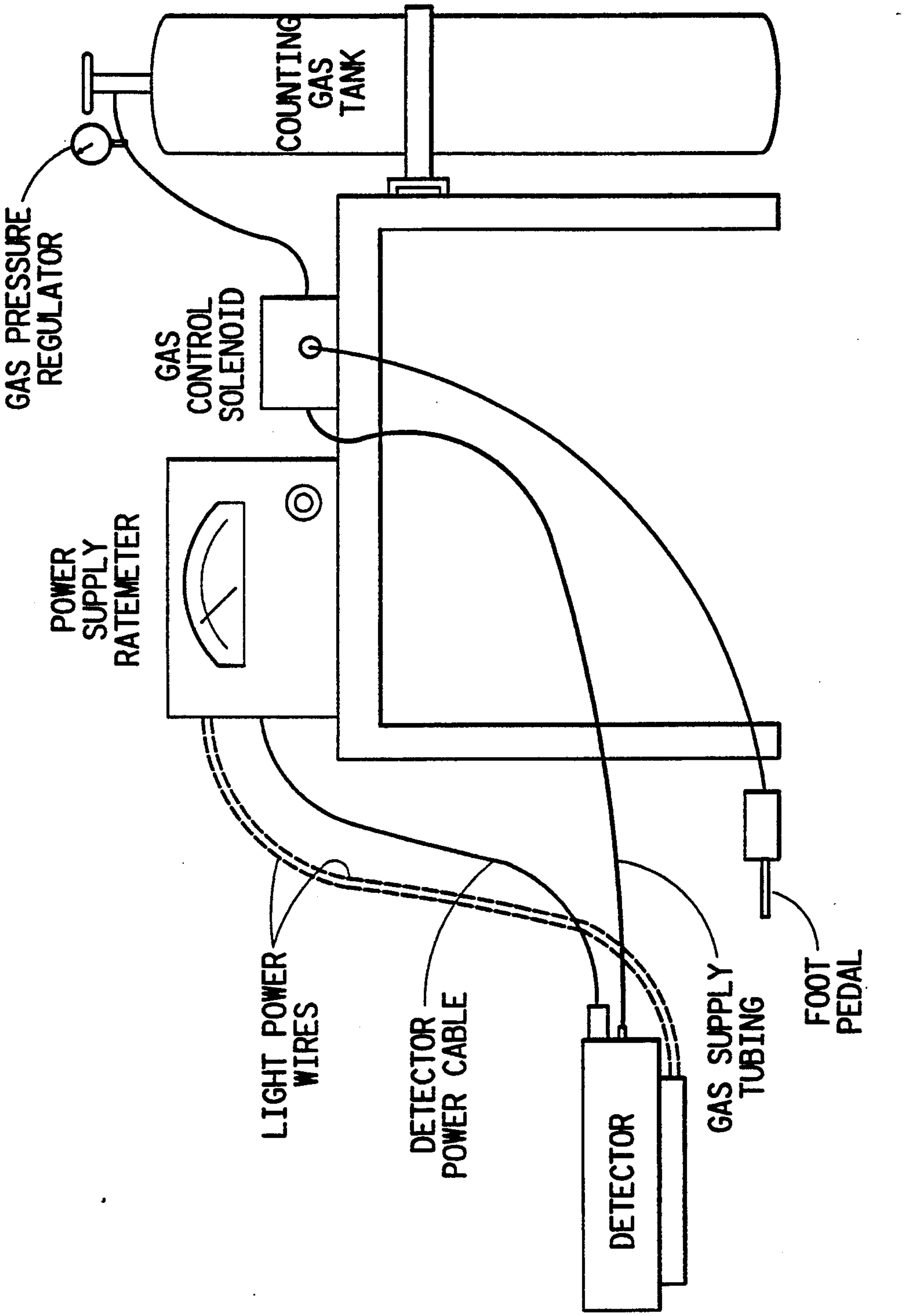
FIG. 3 is a schematic diagram of the detector shown in FIG. 1.

FIG. 3 is a schematic diagram of the detector of FIG. 1.

In still another embodiment this invention concerns a method for monitoring ionizing radiation comprising a) placing a substantially stable, substantially portable open-window gas flow Geiger-Mueller type detector capable of monitoring ionizing radiation including an electrically conducting chamber having one or more fluid inlets, and an opening sized to receive said radiation; fluid supply means connected to said inlets; at least one insulated anode positioned in the chamber; a radiation permeable cover substantially sealed over said opening; electrical supply means connected to the chamber; and means connected to the chamber for detecting electric pulses generated within the chamber when an ionization event is caused by the radiation entering the chamber, proximate a radiation detection target area;

b) continuously introducing fluid into said chamber;

c) energizing said detector;

d) causing radiation entering said chamber to react with the fluid to produce ions;

e) causing said ions to contact an electrode to create electrical pulses; and f) detecting the number of pulses.

There are a variety of ways the detector of the invention can be used to simply, quickly and efficiently monitor for ionizing radiation. For example, the detector of the invention can be mounted in a holder, the radiation permeable cover being readily accessible wherein hands, small tools, wipe smears, and virtually any small easy to handle object can be monitored for the presence of radioactive contamination. In another variation, it is helpful to bring the detector to the object to be monitored. In such a "frisker" configuration, the detector can be used to monitor the entire body (including clothes) and to monitor large or awkward pieces of equipment such as a ladder. In still another variation the device can be configured with a small gas supply and ratemeter to provide for hand carrying or placement on a hand truck or cart. The detector can be passed over surfaces suspected to be contaminated and other objects to determine if radioactive contamination is present (both removable and fixed contamination). Another advantage provided by the detector of the invention is that harmful toxic chemicals are not needed in connection with the operation of this detector. Thus, it is not only environmentally safer but it is also safer for the individual operating the detector. Furthermore, this detector is much simpler to operate and, thus, extensive training of the operator is not required.

Those skilled in the art will appreciate that the above discussion is merely illustrative and that a variety of modifications can be effected all of which fall within in the scope of the invention. This includes the manner in which the detector can be used for example the detector can be hand-held, affixed to an immobile surface or system, etc.

What is claimed is:

1. A substantially stable open-window gas flow Geiger-Mueller type detector capable of monitoring ionizing radiation and capable of being hand held which comprises:

a) an electrically conducting chamber having both (i) a chamber length greater than a chamber depth and (ii) having a plurality of fluid inlets spaced along a side wall of the chamber along the lower half of said side wall, wherein the inlets assist in continuously providing substantially uniform delivery of fluid to the chamber at a substantially constant flow rate, and an opening sized to receive said radiation:

b) fluid supply means connected to said inlets;

c) at least one insulated anode positioned in the chamber;

d) a radiation permeable cover substantially sealed over said opening;

e) electrical supply means connected to the chamber; and f) means connected to said chamber for detecting electric pulses generated within the chamber when an ionization event is caused by the radiation entering the chamber.

2. A detector according to claim 1 further comprising a substantially flat plate connected to the cover and having an opening sized to permit said radiation to pass through said cover and said chamber opening.

3. A detector according to claim 2 wherein the opening in the flat plate is smaller than the opening in the chamber.

4. A detector according to claim 1 wherein the radiation permeable cover is selected from the group consisting of woven or perforated metals and woven or perforated plastics.

5. A detector according to claim 1 wherein the fluid is a counting gas.

6. A detector according to claim 1 wherein the detector further comprising spacing means to provide a space between the radiation permeable cover and a surface suspected to be contaminated with ionizing radiation.

7. A detector according to claim 1 wherein said chamber includes an electrically conducting coating of a conductive paint.

8. A detector according to claim 1 wherein the chamber is made from materials selected from the group consisting of metals, plastics, and resins.

9. A detector according to claim 1 further comprising a substantially flat plate connected to the chamber and having an opening sized and positioned to permit said radiation to pass through said cover and the chamber opening and to permit the fluid to flow through said cover and the chamber opening.

10. A method for monitoring ionizing radiation comprising a) placing a substantially stable open-window gas flow Geiger-Mueller type detector capable of being hand held and capable of monitoring ionizing radiation including an electrically conducting chamber having both (i) a chamber length greater than a chamber depth and (ii) having a plurality of fluid inlets spaced along a side wall of the chamber along the lower half of said side wall, wherein the inlets assist in continuously providing substantially uniform delivery of fluid to the chamber at a substantially constant flow rate, and an opening sized to receive said radiation; fluid supply means connected to said inlets; an insulated anode positioned in the chamber; a radiation permeable cover substantially sealed over said opening; electrical supply means connected to the chamber; and means connected to said chamber for detecting electric pulses generated within the chamber when an ionization event is caused by the radiation entering the chamber, proximate a radiation detection target area;

b) continuously introducing fluid at a substantially constant flow rate into said chamber;

c) energizing said detector;

d) causing radiation entering said chamber to react with the fluid to produce ions;

e) causing said ions to contact an electrode to create electrical pulses; and f) detecting the number of pulses.

11. A method according to claim 10 wherein the detector is placed proximate a source of ionizing radiation selected from the group consisting of beta emitters, gamma emitters, x-ray emitters, and alpha emitters.

12. A method according to claim 10 wherein the source of ionizing radiation is tritium.

13. A method according to claim 10 wherein the fluid is a counting gas.

* * * * *